US011469597B1

(12) United States Patent
Vazquez Oviedo et al.

(10) Patent No.: US 11,469,597 B1
(45) Date of Patent: Oct. 11, 2022

(54) EXPONENTIAL ACTIVE ANTI-ISLANDING METHOD AND DEVICE

(71) Applicant: Instituto Potosino de Investigación Científica y Tecnológica A.C., San Luis Potosí (MX)

(72) Inventors: Erick Israel Vazquez Oviedo, San Luis Potosí (MX); Nimrod Vazquez Nava, Guanajuato (MX); Alejandro Ricardo Femat Flores, San Luis Potosí (MX)

(73) Assignee: Instituto Potosino de Investigacion Cientifica y Tecnologica A.C., San Luis Potosí (MX)

( * ) Notice: Subject to any disclaimer, the term of this patent is extended or adjusted under 35 U.S.C. 154(b) by 0 days.

(21) Appl. No.: 17/237,424

(22) Filed: Apr. 22, 2021

(51) Int. Cl.
*H02J 3/00* (2006.01)
*H02J 1/00* (2006.01)
*H02J 3/38* (2006.01)

(52) U.S. Cl.
CPC ............ *H02J 3/388* (2020.01); *H02J 3/381* (2013.01); *H02J 2300/24* (2020.01)

(58) Field of Classification Search
CPC ......... H02J 3/388; H02J 3/381; H02J 2300/24
See application file for complete search history.

(56) References Cited

U.S. PATENT DOCUMENTS

| 7,275,002 | B2 | 9/2007 | Huang et al. |
| 2001/0056330 | A1 | 12/2001 | Wills |
| 2018/0145582 | A1* | 5/2018 | Shuai ................. H02M 1/32 |
| 2021/0135563 | A1* | 5/2021 | Wei .................... H02M 1/36 |

FOREIGN PATENT DOCUMENTS

JP 5793393 10/2015

OTHER PUBLICATIONS

Wu, Y.K., Lin, J.H, Lin, H.J.: "Standards and Guidelines for Grid-connected Photovoltaic Generation Systems: a Review and Comparison" IEEE Trans. Ind. Appl., 2017, 53, (4), pp. 3205-3216.
IEEE Std 929: "IEEE Recommended Practice for Utility Interface of Photovoltaic (PV) Systems" (Institute of Electrical and Electronics Engineers, 2000.

(Continued)

*Primary Examiner* — Toan T Vu
(74) *Attorney, Agent, or Firm* — Defillo & Associates, Inc; Evelyn A. Defillo

(57) ABSTRACT

A device and method based on an active anti-islanding technique for Distributed Power Generator Systems. The present invention is based on the Sandia Voltage Shift (SVS) technique, which includes a small Non-Detection Zone (NDZ) and by an acceptable solution to the tradeoff between the output power quality and the effectiveness of islanding detection. The present invention has the advantage to improve the NDZ and to reduce the anti-islanding detection times. This is due to the exponential-product modification made in the positive feedback to inject current, thereby making the response faster than SVS. Additionally, a self-adaptive gain is considered to achieve a low Total Harmonic Distortion (THD) at different power levels.

4 Claims, 8 Drawing Sheets

(56) References Cited

OTHER PUBLICATIONS

Stevens, J., Bonn, R., Ginn, J., Gonzalez, S.: "Development and Testing of an Approach to Anti-Islanding in Utility-Interconnected Photovoltaic Systems" Other Inf. PBD Aug. 1, 2000, Aug. 2000, p. 58).

Trujillo, C.L., Velasco, D., Figueres, E., Garcerá, G.: "Analysis of active islanding detection methods for grid-connected microinverters for renewable energy processing" Appl. Energy, 2010, 87, (11), pp. 3591-3605.

Vahedi, H., Karrari, M.: "Adaptive fuzzy Sandia frequency-shift method for islanding protection of inverter-based distributed generation" IEEE Trans. Power Deliv., 2013, 28, (1), pp. 84-92).

Singh, J.K., Behera, R.K.: "Hysteresis Current Controllers for Grid Connected Inverter: Review and Experimental Implementation," in "Proceedings of 2018 IEEE International Conference on Power Electronics, Drives and Energy Systems, PEDES 2018" (Institute of Electrical and Electronics Engineers Inc, 2018.

IEEE Standards Coordinating, C. 21: "IEEE Guide for Design, Operation, and Integration of Distributed Resource Island Systems with Electric Power Systems" (Institute of Electrical and Electronics Engineers, 2011).

Jo, J., Cha, H.: "Performance of anti-Islanding of an improved reactive power variation method based on positive feedfback," in "2017 IEEE Energy Conversion Congress and Exposition, ECCE 2017" (Institute of Electrical and Electronics Engineers Inc., 2017), pp. 4761-4765.

Chen, X., Wang, X., Jian, J., Tan, Z., Li, Y., Crossley, P.: "Novel islanding detection method for inverter-based distributed generators based on adaptive reactive power control" J. Eng., 2019, 2019, (17), pp. 3890-3894.

Voglitsis, D., Papanikolaou, N.P., Kyritsis, A.C.: "Active Cross-Correlation Anti-Islanding Scheme for PV Module-Integrated Converters in the Prospect of High Penetration Levels and Weak Grid Conditions" IEEE Trans. Power Electron., 2019, 34, (3), pp. 2258-2274.

Das, P., Ghore, S., Biswal, M.: "Comparative assessment of various islanding detection methods for AC and DC microgrid," in "2020 1st International Conference on Power, Control and Computing Technologies, ICPC2T 2020" (Institute of Electrical and Electronics Engineers Inc., 2020), pp. 396-400.

\* cited by examiner

EXPONENTIAL ACTIVE ANTI-ISLANDING METHOD AND DEVICE

FIELD OF THE INVENTION

The present invention relates to an anti-islanding technique for detecting islanding conditions in an electrical power distribution system.

BACKGROUND OF THE INVENTION

Renewable energies, especially photovoltaic (PV)-Grid-connected systems, are gaining rapidly relevance on green energies as nations promote public policies to reduce greenhouse gas emissions from traditional power plants (Wu, Y. K., Lin, J. H., Lin, H. J.: "Standards and Guidelines for Grid-connected Photovoltaic Generation Systems: a Review and Comparison"*IEEE Trans. Ind. Appl.*, 2017, 53, (4), pp. 3205-3216). Particularly, the increased penetration level of PV-Grid connected systems yields certain problems in power quality and safety, some of them are voltage and frequency disturbances, flickering, waveform distortion, and islanding conditions (IEEE Std 929: "IEEE Recommended Practice for Utility Interface of Photovoltaic (PV) Systems" (Institute of Electrical and Electronics Engineers, 2000). Among all these problems that are related to PV-Grid connected systems, unintentional islanding is one of the most important hazards in safety issues.

Among the power quality and safety, "islanding" is an electrical phenomenon, which occurs when the electric energy that is supplied by the power network is interrupted, but the Distributed Power Generator Systems (DPGS) is still supplying energy to the loads (IEEE Standards Coordinating, C. 21: "IEEE Guide for Design, Operation, and Integration of Distributed Resource Island Systems with Electric Power Systems" (Institute of Electrical and Electronics Engineers, 2011)). Therefore, this condition of energized electric lines in an expected disconnected part of the electric network is a serious safety hazard.

For this specific electric fault, there are several Anti-Islanding (AI) techniques that detect islanding conditions and isolate the DPGS from the utility grid in a short time (Laaksonen, H.: "Advanced islanding detection functionality for future electricity distribution networks"*IEEE Trans. Power Deliv.*, 2013, 28, (4), pp. 2056-2064). Such techniques can be broadly classified into remote and local methods.

Remote AI techniques are based on communication systems to inform of islanding conditions to the DPGS. These schemes are more expensive in comparison with local methods, although with higher reliability. The most representative remote techniques are the Supervisory Control And Data Acquisition (SCADA) and the Power Line Carrier Communication (PLCC) systems. SCADA system has a communication channel between the utility grid and the DPGS to register the status of all the circuit breakers in the Point of Common Coupling (PCC). The status of every PCC is supervised and the data is sent to the substation. During the fault condition, the DPGS receives the signal to open the circuit breaker. PLCC system uses a communication channel in which the grid network transmits the status of the electric grid to the DPGS. In normal operation, the utility grid is transmitting continuously its status to the DPGS. However, when an islanded fault has occurred, the communication channel between the grid network and the DPGS is interrupted, and after a delay (<2 sec.), the circuit breaker in the PCC is opened to disconnect the DPGS.

The other big branch of AI techniques is local methods, which can be divided into passive, machine learning, and active techniques. Passive schemes just monitor voltage, current, and changes of frequency at the PCC without affecting the power quality. They are simple, low-cost schemes and easy to implement. However, these schemes have large Non-Detection Zones (NDZ) where they could fail to detect islanding conditions.

Machine learning schemes are algorithms that need to be trained to classify the islanding and no-islanding cases. They have a good performance in classifying the events. However, if the electric topology changes, these techniques need to be retrained on new electric conditions. Additionally, a machine learning scheme is technically the same as the passive scheme. However, it is classified as an independent group due to the complexity and resource requirements.

Finally, active AI techniques inject disturbances in the current waveform as amplitude, frequency, or phase parameters. When there are no islanding conditions, the perturbations are absorbed by the utility grid. However, when the islanding conditions are satisfied, these perturbations carry the system to instability conditions in order to activate the protection system (Valsamas, F., Voglitsis, D., Rigogiannis, N., Papanikolaou, N., Kyritsis, A.: "Comparative study of active anti-islanding schemes compatible with MICs in the prospect of high penetration levels and weak grid conditions" IET Gener. Transm. Distrib., 2018, 12, (20), pp. 4589-4596.) when the sensed parameters are beyond the threshold limits as per IEEE 1547.1 and IEC 62116 standards.

Two of the most important active AI methods are the Sandia Voltage Shift (SVS) and Sandia Frequency Shift (SFS), which are based on the positive feedback of current and frequency disturbances, respectively (Stevens, J., Bonn, R., Ginn, J., Gonzalez, S.: "Development and Testing of an Approach to Anti-Islanding in Utility-Interconnected Photovoltaic Systems"Other Inf. PBD 1 Aug. 2000, 2000, (August), p. 58). The main disadvantage of these methods is that they reduce the power quality at the Point of Common Coupling (PCC) between the inverter and the utility grid as the value of their constant Gains. Moreover, SVS and SFS have an impact on the utility system transient response.

To manage the problems above, the main contribution of the proposed invention Exponential Active Anti-Islanding Technique ($EA^2T$) is to have a scheme with a faster response than the Sandia Voltage Shift (SVS), which enhances its small Non-Detection Zone (NDZ) and its good compromise between output power quality and the effectiveness of islanding detection. Furthermore, the waveform of the transient response is maintained as in SVS but in shorter period of times. In this regard, the improved detection time recorded by the proposed scheme is due to its adaptive gain, and to the exponential-product modification made in the positive feedback to inject current to the utility grid. Consequently, this feature highlights an improvement in the characteristic of the proposed invention, making it a good alternative for anti-islanding systems.

An important search of similar patents versus this invention has been made. The search result is next:

The US20010056330A1 patent "Anti-islanding method and apparatus for distributed power generation" expresses the same nature of the exponential function of the invention. It states in that another object of US20010056330A1 is where the voltage acceleration function is linear, geometric, exponential, or other increasing function so that disturbances on the utility grid are minimal except during islanding conditions, whereupon the system becomes unstable and quickly trips off. In this sense, the block of Gain Accelerator with the tag (145) is shown in FIGS. 3,4 and 5 in US20010056330A1 patent. In this block, the linear, geometric, exponential, or other increasing function is introduced. After that, this function is multiplied in (147) Power Multiplier by the (210) Power Error Summer. An important non-obvious difference of US20010056330A1 patent versus this invention is the way to multiply the accelerator function with the Voltage Error. In US20010056330A1 patent, the block of Gain Accelerator is multiplied directly by the Voltage Error, meanwhile in this invention, the multiplication is made in the Sign function and in the Exponential function. Moreover, one unit is subtracted from the Exponential function (See equation 7) in order to diminish the distortions while the inverter is injecting current to the utility grid. These advantages can be observed in the experimental results of this invention.

The U.S. Pat. No. 7,275,002B2 "Islanding detection and protection method" expresses the same nature of the exponential function of the invention. It states in the detailed description that the current component that is injected for perturbation can be a linear function, an exponential function or a polynomial function. In this sense, an important non-obvious difference of U.S. Pat. No. 7,275,002B2 versus this invention is the way to obtain the current variation to perturb the electric system. In U.S. Pat. No. 7,275,002B2, an error differential directional component (A sign function) is directly multiplied by a weighting function where a linear, exponential or a polynomial function can be placed, which it can be seen in equation 6 of U.S. Pat. No. 7,275,002B2. Meanwhile in this invention, the multiplication is made in the Sign function and in the Exponential function. Moreover, one unit is subtracted from the Exponential function (See equation 7) in order to diminish the distortions while the inverter is injecting current to the utility grid. These advantages can be observed in the experimental results of this invention.

The JP5793393B2 patent "Isolated operation detection device, grid-connected inverter system, and isolated operation detection method" expresses the use of an exponential function in the isolated operation detection method. The difference of JP5793393B2 patent versus this invention is the use of the exponential function. In JP5793393B2 patent, the exponential function is employed to get a stop band for a transfer function expression which is totally different versus the operation of the present invention.

Active Anti-Islanding (AI) techniques with a positive feedback perturb in a controlled way the voltage or the fundamental frequency of the inverter. In an islanding condition, the injected current from the inverter towards the unpowered grid affects the voltage in the Point of Common Coupling (PCC). Therefore, the active power generated by the DPGS in an islanding fault can be expressed as:

$$P_{DPGS} = V_o^2 / R_G \quad (1)$$

Where $V_o$ is the voltage at the PCC, and $R_G$ is the equivalent resistance after the PCC (utility grid side). In order to see the variation of the active power $P_{DPGS}$ in function of $V_o$, (1) is derived with respect to the voltage $V_o$ at the PCC, and expressed in terms of the active power, following (2).

$$\frac{dP_{DPGS}}{dV_o} = 2\sqrt{\frac{P_{DPGS}}{R_G}} \quad (2)$$

Hence, the change in the voltage $V_o$ can be rewritten as:

$$\Delta V_o = \frac{\Delta P_{DPGS}}{2}\sqrt{\frac{R_G}{P_{DPGS}}} \quad (3)$$

Equation (3) shows that a change in the voltage $V_o$ is directly proportional to a change in the active power $P_{DPGS}$ since the load $R_G$ and the active power $P_{DPGS}$ are considered constants. Therefore, the change in the active power $\Delta P_{DPGS}$ from equation (3) can be rewritten as:

$$\Delta P_{DPGS} = \frac{2V_o}{R_G} \Delta V_o \quad (4)$$

Since $\Delta P_{DPGS}$ can be expressed as $V_o \Delta I$, where $\Delta I$ is the variation of the injected current, (4) turns to:

$$\Delta I = \frac{2}{R_G} \Delta V_o \quad (5)$$

Hence, a variation of the injected current by the inverter is linked directly proportional to a variation of the voltage $V_o$.

In this context, Sandia National Laboratories proposed the change of the chopping fraction of the grid-connected inverter current directly proportional to the instantaneous peak voltage at the PCC (Stevens, J., Bonn, R., Ginn, J., Gonzalez, S.: "Development and Testing of an Approach to Anti-Islanding in Utility-Interconnected Photovoltaic Systems"Other Inf. PBD 1 Aug. 2000, 2000, (August), p. 58). This method uses a linear positive feedback loop of the PCC voltage amplitude to detect islanding. If the voltage amplitude increases/decreases, the inverter rises/reduces its output current and thus the output power; this process continues until the voltage reaches an Over-Under Voltage (OUV) threshold. A block diagram of the basic SVS technique can be seen in FIG. 2 (Without the shaded area). Therefore, in basis of eq. (5), its main equation can be rewritten as:

$$I_{ref\ dis} = k_e V_e \quad (6)$$

Where $I_{ref\ dis}$ is the current perturbation, which is added to the current reference $I_{ref}$ of the inverter current control in order to make the linear positive feedback loop, $V_e$ is the voltage error between a voltage peak reference $V_{p\ ref}$ and the measured voltage $V_p$ at PCC, and $k_e$ is a gain to adjust the response time of the algorithm, which decreases or increases the current that is directly proportional to the voltage error variation $V_e$. As a consequence, the gain $k_e$ should be chosen large enough to detect the islanding condition, avoiding overcurrent which could damage the electric elements (Trujillo, C. L., Velasco, D., Figueres, E., Garcerá, G.: "Analysis of active islanding detection methods for grid-connected microinverters for renewable energy processing"Appl. Energy, 2010, 87, (11), pp. 3591-3605).

In light of the state of the art, the instant invention comprises a modification in the linear positive feedback of the normal SVS, making an exponential-product adjustment to inject current into the utility grid. This indicates that eq. (5) is modified in order to have exponential behavior. This proposed variation is shown in FIG. 2, in the shaded area, and it is composed by a sign, exponential, and an absolute function in order to have the next equation:

$$I_{ref\ dis} = [e^{|k_e V_e|} - 1]\mathrm{sign}(k_e V_e) \quad (7)$$

It can be deduced from FIG. 2 and (7), that if the measured voltage at PCC increases/decreases, the current at the output of the inverter will rise/reduce at an exponential rate until the voltage reaches the OUV threshold, having a better islanding detection time than SVS, which has linear feedback. It is important to highlight that increasing the gain $k_e$ in the SVS affects the system performance at the steady-state while this problem is minimized in the proposed invention EA²T. This result is achieved due to the adaptive gain $k_e$, which depends on the produced power by the inverter $P_{DPGS}$, the maximal deviation of the voltage $V_o$ (in a normal operation at the PCC is 88%≤$V_o$≤110%), and the maximal $THD_i$ (5%) permitted by Standard 1547. Consequently, the adaptive gain $k_e$ can be obtained from (7) and written in function of $P_{DPGS}$, $V_o$, and the voltage peak reference $V_{p\ ref}$:

$$k_e = \frac{\ln\left(0.05\frac{P_{DPGS}}{3V_o} + 1\right)}{0.12V_{p\ ref}} \quad (8)$$

Thus, the gain $k_e$ is not a constant as in SVS but it is in function of the injected power in order to reduce the disturbance current component at low power. It also improves the detection ability of the island fault at high power and reduces the detection time.

BRIEF SUMMARY OF THE INVENTION

The instant invention describes an anti-islanding control system to detect if the electric grid is turned off, comprising a source of power (Distributed Power Generator System—DPGS) (202), an inverter (204) which is interconnected by a transformer (206) to the grid (208), wherein a voltage signal (218) is measured in (210) to get the peak voltage value $V_p$ (222) with the block (220). The peak voltage value $V_p$ (222) is modified by a second signal (230) therefore generating a third signal $V_e$ (224) which is multiplied by the optimal Gain $k_e$, wherein the control system is modulated by (232) and it is calculated by the function $$k_e = \frac{\ln\left(0.05\frac{P_{DPGS}}{3V_o} + 1\right)}{0.12V_{p\ ref}}$$

which is in function of the injected power $P_{DPGS}$. The voltage error $V_e$ (224) is multiplied by the optimal Gain $k_e$ and it is processed in parallel by sign function (236), and by an absolute (234) and exponential function (238).

In a preferred embodiment, the control system further comprises an exponential current perturbation $I_{ref\ dis}$ (212), which is added to the current reference $I_{ref}$ (216) of the inverter current control (214); wherein the optimal Gain $k_e$ (232) warrants a maximal $THD_i$ (5%) in the current; wherein said current is the maximal permitted by Standard 1547; wherein the voltage signal $V_p$ (222) is compared with an over/under threshold (228). Finally, if the voltage signal $V_p$ (222) is out of this normal operation range, then a disconnection signal (226) is activated to turn off the inverter, otherwise, if the voltage signal $V_p$ (222) is in this normal operation range, then the inverter remains injecting current to the grid (208). In a further embodiment the system comprises a sensor to get the voltage signal $V_o$ (218) at the PCC (Point of Common Coupling) (210); wherein the block (220) gets the peak voltage value of $V_o$, which is calculated by $V_p = \sqrt{2}V_{rms}$.

In a second aspect, the invention discloses a method for detecting if the electric grid is turned off, comprising the steps of:
a) Measure the voltage at the PCC (Point of Common Coupling);
b) calculate the peak voltage amplitude of the voltage at the PCC c) compare the peak voltage amplitude with a reference to get an error voltage
d) calculate an optimal Gain in function of the injected power,
e) calculate an exponential current perturbation in function of the optimal Gain and the error voltage, adding to the injected reference current by the inverter to the grid.

In a further embodiment said method further comprises updating the injected power by an exponential current perturbation.

Finally, as a result, if the peak voltage is over or under a voltage threshold, this means that the electric grid is turned off and the inverter must be shut down, otherwise, if the peak voltage remains in the normal operation range, that means the electric grid is still operating.

BRIEF DESCRIPTION OF THE DRAWINGS

FIG. 3a shows 0-80 kW Power range. FIG. 3b shows 0-8 kW Power range. FIG. 3c shows 0-0.8 kW Power range.

FIG. 4a shows a Perspective 1 and FIG. 4b shows a perspective 2. Power evaluation range: 1-8 kW. Gain $k_e$ evaluation range: 0.01-0.08 (according to FIG. 3 (b)). Islanding detection times are in function of injected power and the gain $k_e$. $V_o$ is fixed in 220 $V_{rms\ ph-ph}$.

FIG. 5a shows perspective 1. FIG. 5b shows a perspective 2. Power evaluation range: 1-8 kW. Grid voltage $V_o$ evaluation range: 88-110%.

FIG. 6a shows an Electric diagram. FIG. 6b shows EA²T. FIG. 6c shows SVS. Voltage at PCC (up), and islanding and detection flags (down).

FIG. 7a shows an electric diagram. FIG. 7b shows EA²T. FIG. 7c shows SVS. Voltage at PCC (up), and islanding and detection flags (down).

FIG. 8a shows an electric diagram. FIG. 8b shows EA²T. FIG. 8c shows SVS. Voltage at PCC (up), and islanding and detection flags (down).

FIG. 9a shows an electric diagram. FIG. 9b shows EA²T. FIG. 9c shows SVS. Voltage at PCC (up), and islanding and detection flags (down).

DETAILED DESCRIPTION OF THE INVENTION

In a further embodiment, the invention comprises a method to detect if the electric grid is turned off. The method is described in FIG. 1 with a flowchart of nine steps. First, the voltage at the PCC (Point of Common Coupling) is measured (S102), then the peak voltage amplitude of the voltage at the PCC is calculated (S104). At this time, the peak voltage amplitude is compared with a reference to get an error voltage (S106), and an optimal Gain is calculated in function of the injected power (S108). After that, an exponential current perturbation is calculated in function of the optimal Gain and the error voltage (S110), and it is added to the injected reference current by the inverter to the grid (S112). Now, the injected power is updated as a result of the exponential current perturbation (S114). Finally, if the peak voltage is over or under a voltage threshold (S116), this means that the electric grid is turned off and the inverter must be shut down (S118), otherwise, if the peak voltage remains in the normal operation range, that means the electric grid is still operating.

In a detailed embodiment, said method for detecting if the electric grid is turned off, comprises the steps of:

a) Measure the voltage at the PCC (Point of Common Coupling);

b) calculate the peak voltage amplitude of the voltage at the PCC c) compare the peak voltage amplitude with a reference to get an error voltage d) calculate an optimal Gain in function of the injected power, e) calculate an exponential current perturbation in function of the optimal Gain and the error voltage, adding to the injected reference current by the inverter to the grid.

In a further embodiment said method further comprises updating the injected power by an exponential current perturbation.

Finally, as a result, if the peak voltage is over or under a voltage threshold, this means that the electric grid is turned off and the inverter must be shut down, otherwise, if the peak voltage remains in the normal operation range, that means the electric grid is still operating.

Figure 2:
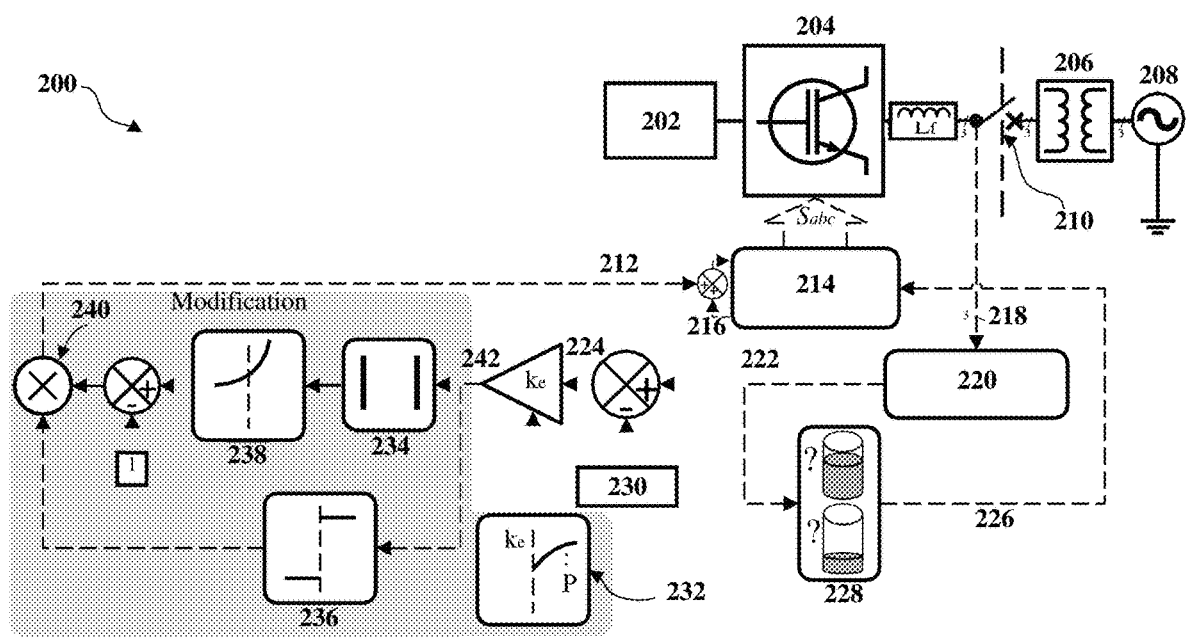
FIG. 2 shows a system for detecting islanding 200, wherein 202 is the source of power DPGS (Distributed Power Generator System), 204 is the Inverter, 206 is the Transformer, 208 is the electric grid, 210 is the Point of Common Coupling (PCC), 212 is the exponential current perturbation signal $I_{ref\ dis}$, 214 is the inverter current controller, 216 is the current reference $I_{ref}$, 218 is the voltage sensor 220 is the root mean square voltage of the sensed voltage $V_o$ at PPC, 222 is the peak voltage amplitude $V_p$, 224 is the voltage error $V_e$, 226 is the disconnection signal, 228 is comparator the Over-Under Voltage (OUV) threshold, 230 is the voltage peak reference $V_{p\ ref}$, 232 is the dinamical gain $k_e$ that is in function of the injected power, 234 is the absolute function, 236 is the Sign function, 238 is the exponential function, 240 is a multiplier, 242 is the $V_e K_e$ signal.

Furthermore, the invention comprises an anti-islanding control system to detect if the electric grid is turned off. The system is depicted in FIG. 2 and comprises of the source of power (Distributed Power Generator System—DPGS) (202), and an inverter (204) which is interconnected by a transformer (206) to the grid (208). Moreover, it is comprised by a sensor to get the voltage signal $V_o$ (218) at the PCC (Point of Common Coupling) (210), after that, the block (220) gets the peak voltage value $V_p$ (222) of $V_o$, applying the next equation: $V_p = \sqrt{2} V_{rms}$. Then, the signal $V_p$ (222) is compared with a voltage peak reference $V_{p\,ref}$ (230) and the voltage error $V_e$ (224) is generated to be multiplied by the optimal Gain $k_e$. This optimal Gain $k_e$ (232) is calculated by the function (8), which is in function of the injected power $P_{DPGS}$ in order to warranty a maximal $THD_i$ (5%) in the current permitted by Standard 1547. Afterwards, the voltage error $V_e$ (224) multiplied by the optimal Gain $k_e$ is processed in parallel by sign function (236), and by an absolute (234) and exponential function (238). This process can be formally written as the equation (7). The calculated signal (Shaded area) is the exponential current perturbation $I_{ref\,dis}$ (212), which is added to the current reference $I_{ref}$ (216) of the inverter current control (214). Finally, the voltage signal $V_p$ (222) is compared with an over/under threshold (228). If the peak voltage signal $V_p$ (222) is out of this normal operation range, then a disconnection signal (226) is activated to turn off the inverter, otherwise, if the peak voltage signal $V_p$ (222) is in this normal operation range, then the inverter remains injecting current to the grid (208).

Thus, the anti-islanding control system detects if the electric grid is turned off, comprising a source of power (Distributed Power Generator System—DPGS) (202), an inverter (204) which is interconnected by a transformer (206) to the grid (208), wherein a voltage signal (218) is measured in (210) to get the peak voltage value $V_p$ (222) with the block (220). The peak voltage value $V_p$ (222) is modified by a second signal (230) therefore generating a third signal $V_e$ (224) which is multiplied by the optimal Gain $k_e$, wherein the control system is modulated by (232) and it is calculated by the function $$k_e = \frac{\ln\left(0.05 \frac{P_{DPGS}}{3V_o} + 1\right)}{0.12 V_{p\,ref}}$$

which is in function of the injected power $P_{DPGS}$, wherein the voltage error $V_e$ (224) multiplied by the optimal Gain $k_e$ is processed in parallel by sign function (236), and by an absolute (234) and exponential function (238).

In a preferred embodiment, the control system further comprises an exponential current perturbation $I_{ref\,dis}$ (212), which is added to the current reference $I_{ref}$ (216) of the inverter current control (214); wherein the optimal Gain $k_e$ (232) warrants a maximal $THD_i$ (5%) in the current; wherein said current is the maximal permitted by Standard 1547; wherein the voltage signal $V_p$ (222) is compared with an over/under threshold (228). Finally, if the voltage signal $V_p$ (222) is out of this normal operation range, then a disconnection signal (226) is activated to turn off the inverter, otherwise, if the voltage signal $V_p$ (222) is in this normal operation range, then the inverter remains injecting current to the grid (208). In a further embodiment the system comprises a sensor to get the voltage signal $V_o$ (218) at the PCC (Point of Common Coupling) (210); wherein the block (220) gets the peak voltage value of $V_o$, which is calculated by $V_p = \sqrt{2} V_{rms}$.

In a preferred embodiment, the system of the invention comprises a modification block in the linear positive feedback of the normal SVS, making an exponential-product adjustment to inject current into the grid. This means, eq. (5) is modified in order to have exponential behavior. This proposed variation is shown in FIG. 2, in the shaded area, and it is composed by a sign, exponential, and an absolute function in order to have the next equation:

$$I_{ref\,dis} = [e^{|k_e V_e|} - 1] \text{sign}(k_e V_e) \quad (7)$$

It can be deduced from FIG. 2 and (7), that if the measured voltage at PCC increases/decreases, the current at the output of the inverter will rise/reduce at an exponential rate until the voltage reaches the OUV threshold, having a better islanding detection time than SVS, which has linear feedback. It is important to say that increasing the gain $k_e$ in the SVS affects the system performance at the steady-state while this problem is minimized in the proposed invention EA²T. This result is achieved due to the self-adaptive gain $k_e$, which depends on the produced power by the inverter $P_{DPGS}$, the maximal deviation of the voltage $V_o$ (in a normal operation at the PCC is 88% ≤ $V_o$ ≤ 110%), and the maximal $THD_i$ (5%) permitted by Standard 1547. Consequently, the gain $k_e$ can be obtained from (7) and written in function of $P_{DPGS}$, $V_o$, and the voltage peak reference $V_{p\,ref}$:

$$k_e = \frac{\ln\left(0.05 \frac{P_{DPGS}}{3V_o} + 1\right)}{0.12 V_{p\,ref}} \quad (8)$$

Thus, the gain $k_e$ is not a constant as in SVS but it is in function of the injected power in order to reduce the disturbance current component at low power. It also improves the detection ability of the island fault at high power and reduces the detection time.

The sensitivity analysis of gain $k_e$ is provided in function of islanding detection times, the power quality, and the effectiveness of the islanding detection. Specifically, the gain $k_e$ is chosen in such a way that the injected current to the grid has a $THD_{i\,max}$ of less than 5%, according to IEEE 1547 Standard. Moreover, the gain $k_e$ should have a small NDZ, enough to trigger the anti-islanding mode when an islanding case occurs. These two points should be taken into consideration in order to guarantee a smooth power injection to the grid.

Figure 3A:
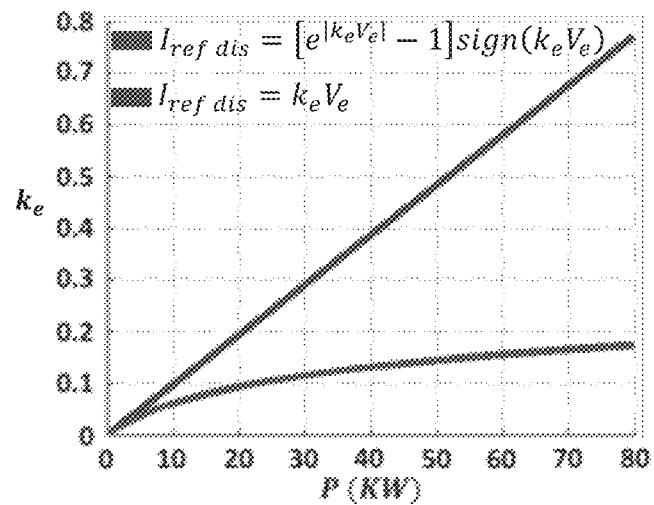
FIGS. 3a-c. show gain $k_e$ in function of the injected power for SVS and EA²T with a $THD_i$ max=5% according to IEEE 1547 Standard. $V_o$ is fixed in 220 $V_{rms\ ph-ph}$.
Figure 3B:
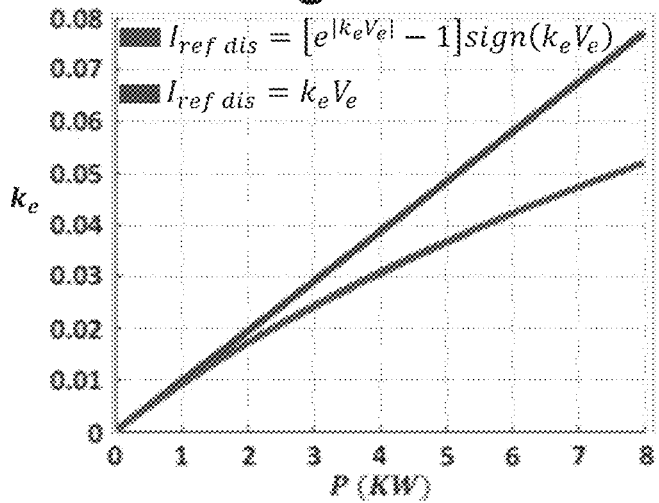
Figure 3C:
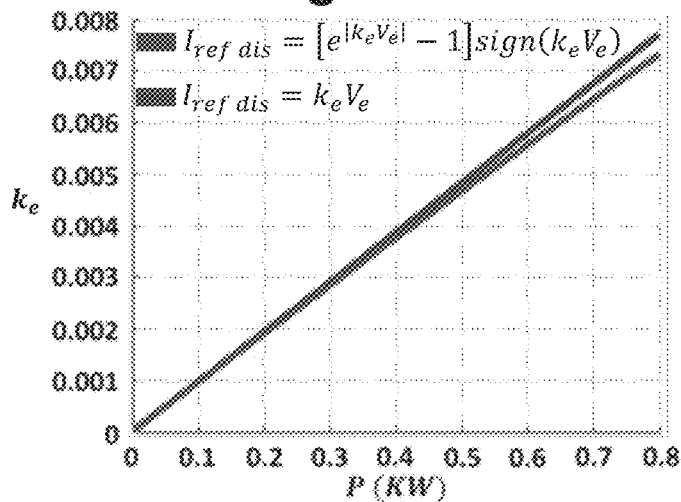

In this context, a simulation in MATLAB platform has been developed taking into account the equations (6)-(8) and the maximal $THD_i$ according to IEEE 1547 Standard. Therefore, charts of the gain $k_e$ as a function of the injected power for SVS and EA²T are depicted in FIG. 3. This is, for a given injected power P, a certain gain $k_e$ must be selected in equations (6) and (7) in order to preserve a $THD_i$ in the injected current of less than 5%, either for SVS (blue line) or EA²T (red line) depicted in FIG. 3. The values of the gain $k_e$ for SVS and EA²T in an injected power range of 0-80 kW can be seen in FIG. 3 (a). All values below the blue line and red line (SVS and EA²T, respectively) mean that the injected current has a $THD_i$ less than 5%. It is important to note that the gain $k_e$ for SVS is directly proportional to the injected power, while for EA²T is logarithmically proportional to the injected power (See eq. (8)), due to the exponential function used in the EA²T. This logarithmic behavior of the gain $k_e$ for EA²T makes a lower rate of change in the gain $k_e$ as compared to SVS. It can be seen the important difference in the rate of growth of the gain $k_e$ for SVS (linear growth) and EA²T (logarithmic growth) in FIG. 3 (a). This behavior is less noticeable in smaller injected power ranges as it can be seen in FIG. 3 (b) and FIG. 3 (c), which are in an injected power range of 0-8 kW and 0-0.8 kW, respectively.

Figure 4A:
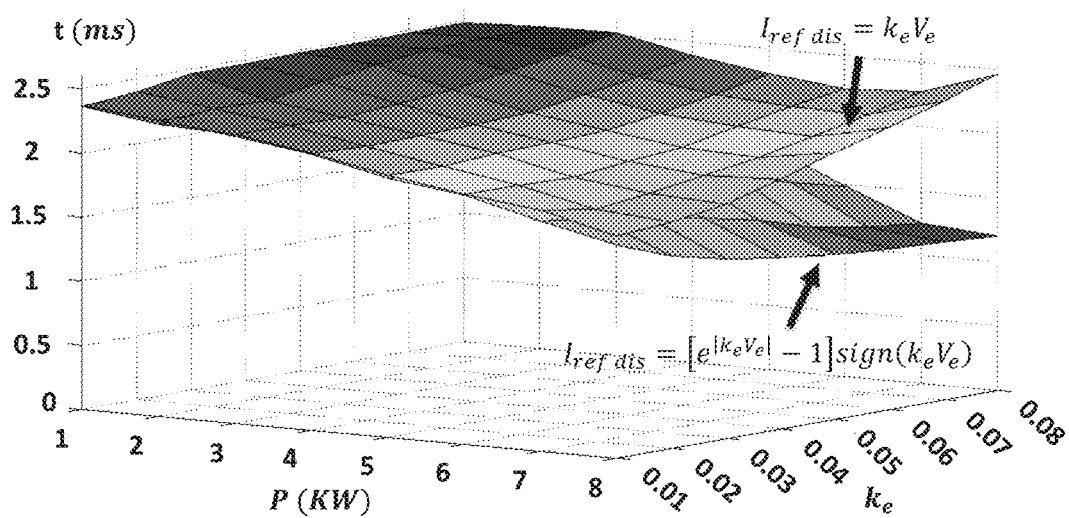
FIGS. 4a-b show islanding detection times comparison of SVS and EA²T.
Figure 4B:
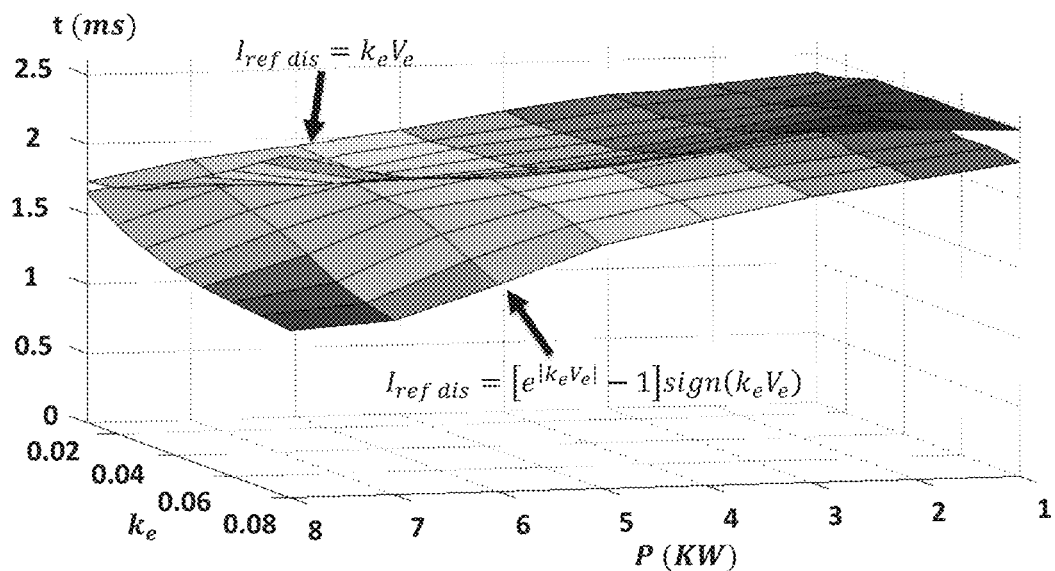

Furthermore, interconnected system DPGS-electric grid is modeled in MATLAB Simulink as the arrangement shown in FIG. 2 for SVS and EA²T. Different cases are simulated to register the islanding detection times as a function of different values of gain $k_e$ (8) according to different values of the injected power. In this context, it can be seen in FIG. 4 that the islanding detection time is in function of the gain $k_e$ and the injected power. These two variables are in a range of $k_e$=0.01-0.08, and a range of the injected power of 1-8 kW as it is registered in FIG. 3 (b). Also, it can be seen in two different perspectives in FIG. 4 that the EA²T has lower islanding detection times as compared to SVS. The greater the gain $k_e$ and the injected power are, the shorter the islanding detection times are in comparison with SVS. It is important to notice that the maximum difference of islanding detection times is when the gain $k_e$ and the injected power are the highest value, this is, 0.08 and 8 kW, respectively. As a result, FIG. 4 (a) and (b) show that the SVS tends to have higher times, while the EA²T tends to keep lower detection times for higher values of the gain $k_e$ and the injected power.

For multiple DPGS, many different scenarios should be considered to acquire a relationship among the gain $k_e$, the number of DPGS, and the power generated individually. In this sense, there is a deep study for multiple DPGS using active AI techniques (Vahedi, H., Karrari, M.: "Adaptive fuzzy Sandia frequency-shift method for islanding protection of inverter-based distributed generation"IEEE Trans. Power Deliv., 2013, 28, (1), pp. 84-92), which depicts that the gain $k_e$ of every DPGS should be proportional by a factor of the fraction of the power that each DPGS shares. Certainly, a deeper study should be conducted for multiple DPGS using EA²T. Therefore, multiple DPGS with EA²T is out of the scope in this patent.

EXAMPLES

Example 1

Performance of the Invention in Steady State in Normal Operation Voltage Range

An analysis of the invention performance in the steady-state in normal operating voltage range has been performed. For this examination, the interconnected system DPGS-electric grid shown in FIG. 2 has been modeled in MATLAB Simulink in a steady state operation. The $THD_i$ of the injected current has been calculated in function of the Power and the voltage magnitude in a range of 88%-110% of the voltage grid $V_o$, this is, in a range of 193.6 $V_{rms\,ph-ph}$-242 $V_{rms\,ph-ph}$. Moreover, the power evaluation range for the evaluated system shown in FIG. 2 is 1-8 kW and the values of $L_f$ and its parasite resistance are 7 mH and 1Ω, respectively.

Figure 5A:
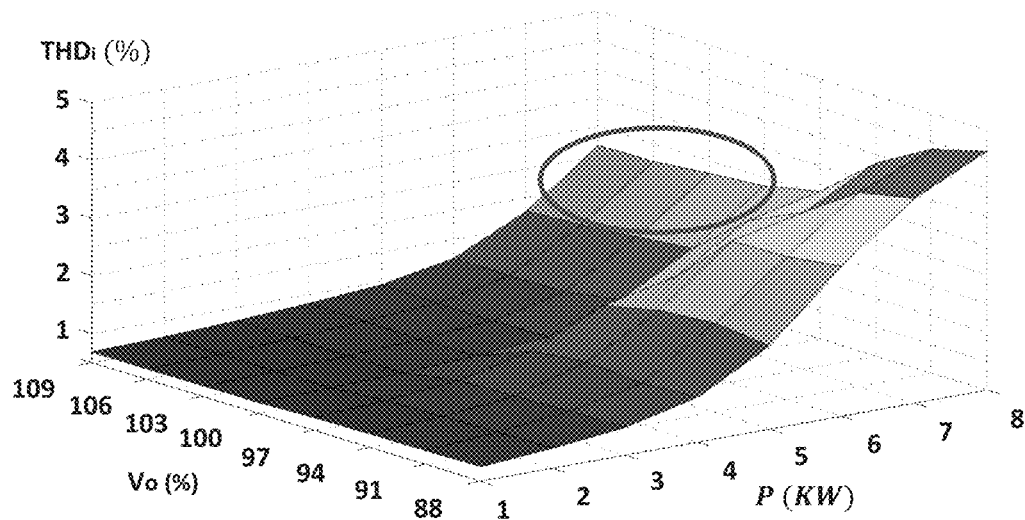
FIGS. 5a-b show a current Injection Performance of EA²T in Steady State in Normal Operation Voltage Range (88%-110% of $V_o$) according to Std. 1547 and Std. 929-2000 for six-pulse converters.
Figure 5B:
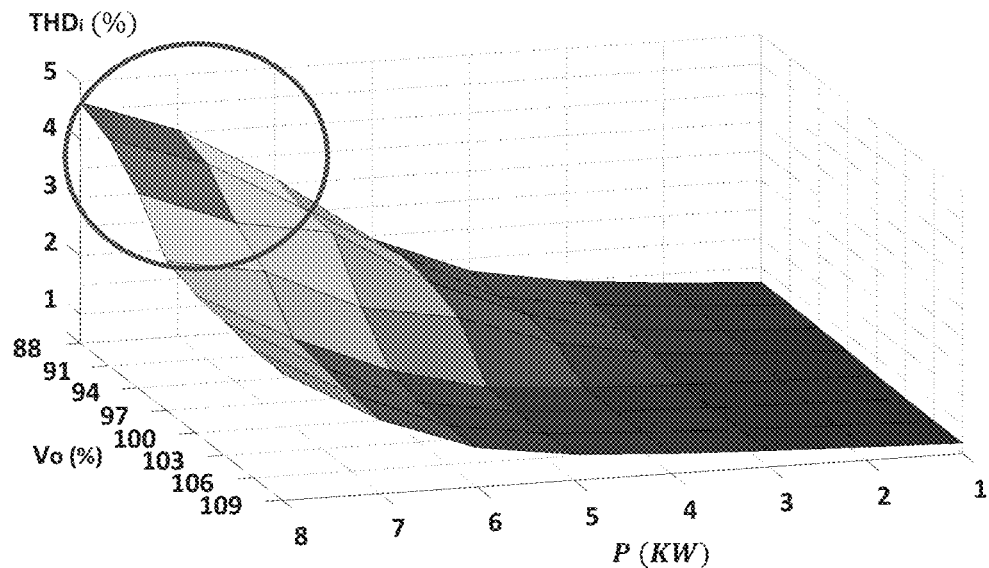

As a result, in FIG. 5 is shown the behavior of the $THD_i$ of the injected current (z-axis) in function of the injected power to the grid (x-axis) and the voltage magnitude (y-axis). It can be seen in FIG. 5 (a) (Perspective 1) in the red circle that the $THD_i$ remains under 3% for voltage magnitudes between 100%-110% (220 $V_{rms\ ph-ph}$-242 $V_{rms\ ph-ph}$). On the other hand, for voltage magnitudes between 88%-100% (193.6 $V_{rms\ ph-ph}$-220 $V_{rms\ ph-ph}$) the calculated $THD_i$ has an increasing behavior till 4.6% for an injected power of more than 5 kW, as it is depicted in FIG. 5 (b) (Perspective 2) in the red circle. This is, the less voltage magnitude is, the more $THD_i$ is generated in the injected current. This is due to the decreasing level to absorb perturbations by the grid when the voltage level is lower than the normal magnitude level.

Hence, in order to ensure a $THD_i$ lower than 5% when the $V_o$ is varying over the normal voltage operation, the gain $k_e$ is chosen smaller than any value below of the red line in FIG. 3, depending on the injected power value. This selection of the gain $k_e$ will extend the detection time in a small percentage when a fault occurs, depending on how far away the assigned gain value $k_e$ is. It is important to mention that the gain $k_e$ has a lower limit value before the anti-islanding technique stops to detect fault conditions. This value depends greatly on the electrical noise in the voltage sensor and the control board resolution. Therefore, it should be fixed by experimental data.

Example 2

Experimental Test of the Invention

Figure 1:
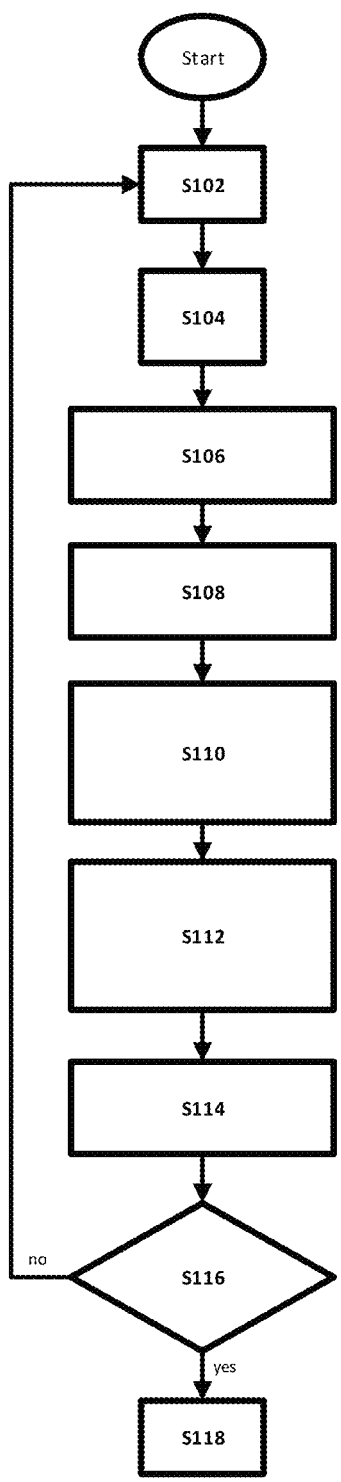
FIG. 1 shows a flowchart of the method. The voltage at the PCC (Point of Common Coupling) is measured (S102), then the peak voltage amplitude of the voltage at the PCC is calculated (S104). At this time, the peak voltage amplitude is compared with a reference to get an error voltage (S106), and an optimal Gain is calculated in function of the injected power (S108). After that, an exponential current perturbation is calculated in function of the optimal Gain and the error voltage (S110), and it is added to the injected reference current by the inverter to the grid (S112). The injected power is updated as a result of the exponential current perturbation (S114). Finally, if the peak voltage is over or under a voltage threshold (S116), this means that the electric grid is turned off and the inverter must be shut down (S118), otherwise, if the peak voltage remains in the normal operation range, that means the electric grid is still operating.

Experimental tests of the method in FIG. 1 and the system in FIG. 2 are presented below to validate the high performance of the invention versus the normal technique SVS. The present invention $EA^2T$ and the SVS techniques were implemented in a Single Board of National Instruments based on an FPGA Xilinx Spartan-6 LX45 at 2.5 MHz. Also, the main inverter controller implemented in simulation and experimental tests is a digital controller, where the errors between the sensed currents on the PCC and sinusoidal references stated by the voltage grid are minimized by a single band hysteresis current controller, which is best known for robustness, fast error tracking, good dynamic response, and ease of implementation (Singh, J. K., Behera, R. K.: "Hysteresis Current Controllers for Grid Connected Inverter: Review and Experimental Implementation," in "Proceedings of 2018 IEEE International Conference on Power Electronics, Drives and Energy Systems, PEDES 2018" (Institute of Electrical and Electronics Engineers Inc., 2018)).

In this context, it is important to highlight that these experimental tests were made in a three-phase two-stage conventional inverter connected to a local load, and a programmable ac power source Chroma 61700 which emulates the utility grid. The DPGS is emulated by a Genesys™ 2U 5 kW Programmable DC Power Supply and the inductors $L_f$ and parasite resistances are 7 mH and 1Ω, respectively. Moreover, the current and voltage sensors (current transducer LA55-P/SP1 and voltage transducer LV25-P) have response times of 40 us and 1 us, respectively. It can be seen that these response times are much faster than the detection times showed in the previous section, which are in the order of milliseconds. Consequently, the dynamic response of the current and voltage sensors is almost instantaneous and can be omitted for simplification purposes.

Figure 6A:
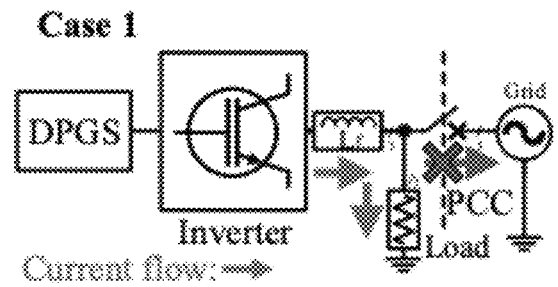
FIGS. 6a-c show an experimental test, Case 1. Performance of EA²T and SVS anti-islanding techniques when there is no current injection to the grid.
Figure 6B:
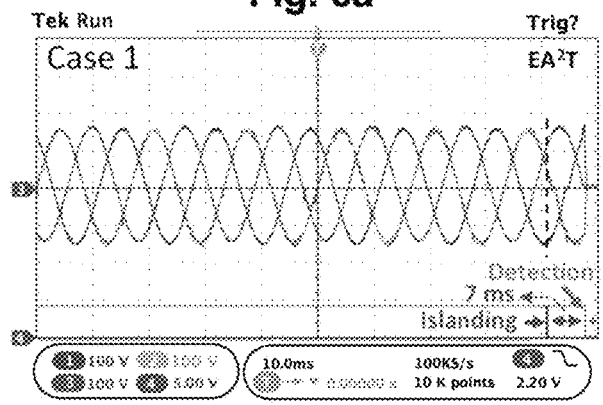
Figure 6C:
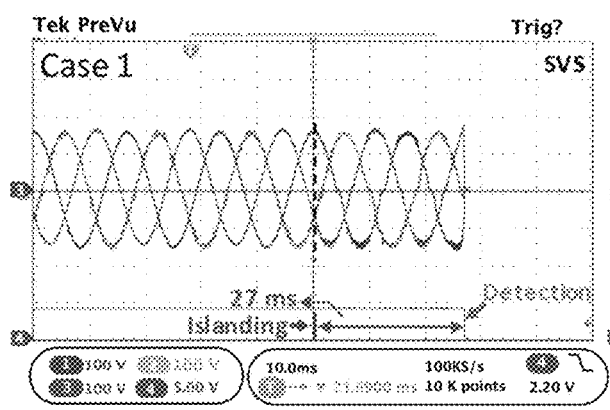

After the experimental setup explanation, the experimental tests are divided into four cases according to the current flow among the DPGS-Inverter, Load, and Grid (See e.g. FIG. 6 (a)). Furthermore, every case shows the three-phase voltages at the PCC, and the islanding interruption and detection Boolean flags at the bottom of every graphic (See e.g. FIG. 6 (b) and (c)). In this sense, the ac power source Chroma 61700 (Emulated grid) activates a bit flag to know that the islanding fault has occurred (Indicated in blue at the bottom of e.g. FIG. 6 (b) and (c)). Besides, the power quantities of every case are depicted in Table 1, whereas the current graphics have been omitted to reduce the space in the patent due to the fact that they have similar waveforms of the voltages since a linear load was employed, except for case 4.

TABLE 1

Experimental Test Power Flow.

| Case | DPGS Power | Load Power | Grid Power |
| --- | --- | --- | --- |
| 1 | 1000 W | 1000 W | 0 W |
| 2 | 300 W | 1000 W | 700 W |
| 3 | 1300 W | 1000 W | −300 W (Injected) |
| 4 | 1000 W | 250 W | −750 W (Injected) |

1.1. Case 1

Case 1 is when there is no current injection to the Grid. Certainly, it is the most critical case and is made to verify the NDZ of the proposed invention since the power consumed by the load must be exactly the same as the power produced by the DPGS. Therefore, the current flows just from the DPGS-Inverter to the Load, as it can be seen in FIG. 6 (a). The DPGS-inverter generates 1 kW (±0.05%). Consequently, the self-adaptive gain $k_e$ (Eq. 8) for $EA^2T$ assigns the value of 0.009. While the gain for SVS is manually selected to a value of 0.01 according to FIG. 3 to maintain the $THD_i$ less than 5%. The increase of the $THD_i$ in the transient gap is a sign that the contribution of the exponential current perturbation $I_{ref\ dis}$ is present in the current reference $I_{ref}$ since the islanding occurs until the technique detects the fault. Furthermore, it can be seen in FIG. 6 (b) and (c) the velocity of $EA^2T$ and SVS techniques in the transient gap, respectively. As a result, the $EA^2T$ takes 7 ms to detect the islanding condition, while, the SVS takes a longer time of 27 ms to detect the fault (See FIG. 6 (c)). That is more than three times the $EA^2T$ detection time. Consequently, this performance agrees with equations (6) and (7) since the $EA^2T$ has an exponential behavior, while SVS has a linear performance until the threshold is triggered.

1.2. Case 2

Figure 7A:
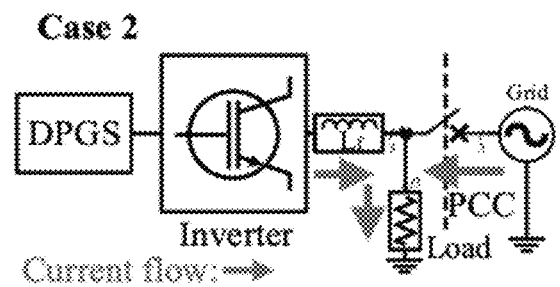
FIGS. 7a-c show an experimental test, Case 2. Performance of EA²T and SVS anti-islanding techniques when the DPGS and the grid are feeding the local load.
Figure 7B:
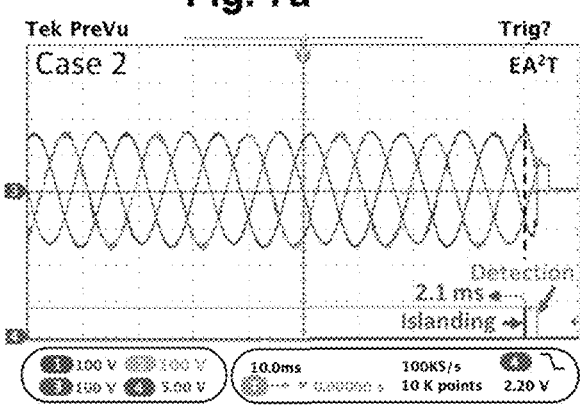
Figure 7C:
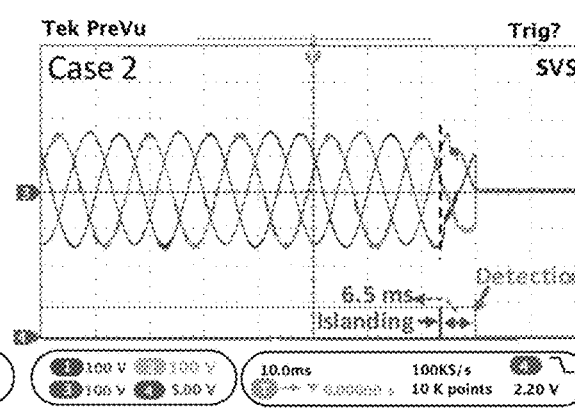

Case 2 is shown in FIG. 7 (a). This case is when the DPGS-Inverter and the Grid share the power generation to feed the local Load. For this experiment, the DPGS-inverter generates 0.3 kW (±0.05%) and the grid produces 0.7 kW (±0.1%) to feed a local load of 1 kW. According to eq. (8), the self-adaptive gain $k_e$ takes a value of 0.0028 for $EA^2T$. Meanwhile, for SVS is 0.0029 to preserve the $THD_i$ less than 5% as it is depicted in FIG. 3. As a result, FIG. 7 (b) shows a very short transient with a duration of 2.1 ms. Certainly, the transient has a bigger perturbation than in case 1, but smaller than the SVS depicted in FIG. 7 (c), which has a longer detection time of 6.5 ms with a pronounced perturbation caused by the contribution of the exponential current perturbation $I_{ref\ dis}$. It is important to highlight that in this case, the voltage signals were getting smaller in amplitude until the lower threshold was triggered in both techniques at different velocities: exponential ($EA^2T$) and linear (SVS) rate. In particular, for $EA^2T$, this mechanism is possible due to the Sign and Absolute function, i.e. the Sign function gives the negative sign to "exp($|k_eV_e|$)−1", for a negative error $V_e$ for this case.

1.3. Case 3

Figure 8A:
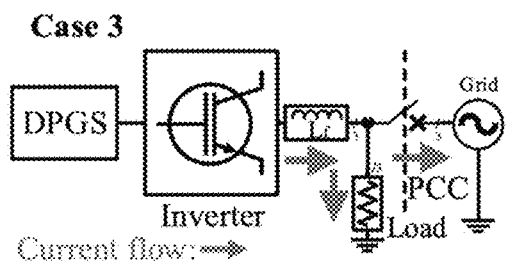
FIGS. 8a-c show an experimental test, Case 3. Performance of EA²T and SVS anti-islanding techniques when the DPGS is injecting current to the grid and to the local load.
Figure 8B:
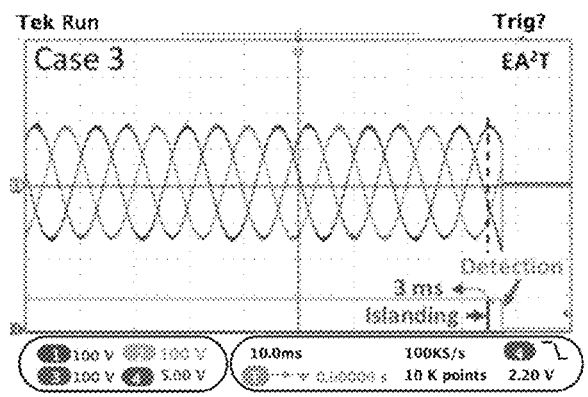
Figure 8C:
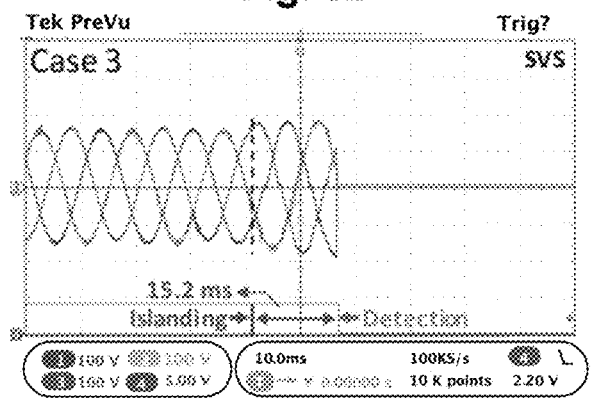

The FIG. 8 (a) shows the Case 3 where the DPGS-Inverter injects current to the Grid and also feeds the local Load. In this case, the DPGS-inverter produces 1.3 kW (±0.05%), of which 0.3 kW are injected to the Grid and 1 kW is consumed by the local Load. Therefore, the gain $k_e$ for SVS is manually selected to a value of 0.013 according to FIG. 3 to maintain the $THD_i$ less than 5% while the self-adaptive gain (Eq. 8) for $EA^2T$ gives the value of 0.011. FIG. 8 (b) and (c) show that the upper threshold was triggered by the increase of the voltage signals because $V_p$ was bigger than $V_{p\ ref}$ and hence, $V_e$ was positive in the first moment of the islanding condition. Therefore, it can be seen a clear distortion in the signals with a drastic difference of velocities in the transient, exponential ($EA^2T$), and linear rate (SVS). As a result, the $EA^2T$ technique has a detection time of 3 ms, whereas the SVS technique has a longer detection time of 15.2 ms.

1.4. Case 4

Figure 9A:
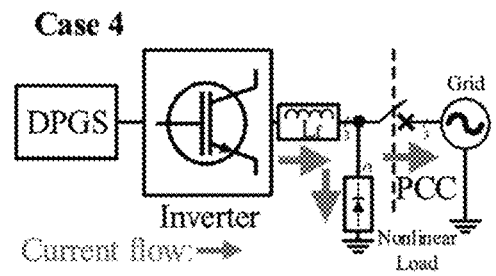
FIGS. 9a-c show an experimental test, Case 4. Performance of EA²T and SVS anti-islanding techniques when the DPGS is injecting current to the grid and to the local nonlinear load
Figure 9B:
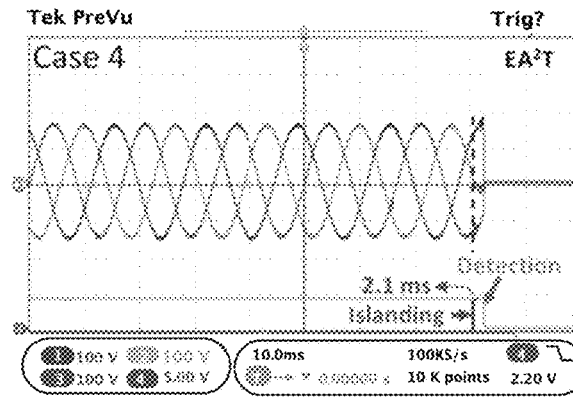
Figure 9C:
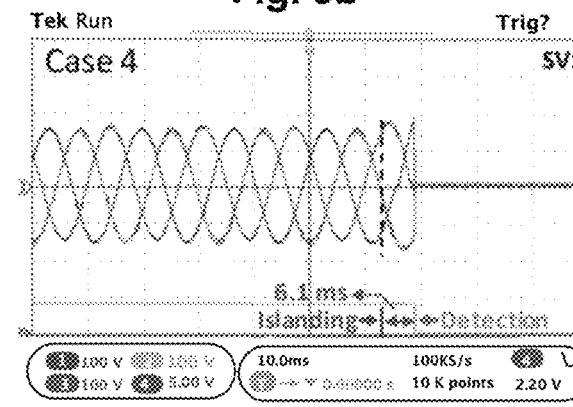

Finally, Case 4 is shown in FIG. 9 (a). In this case, the DPGS-Inverter produces 1 kW (±0.05%), injects 0.75 kW to the Grid and also feeds a 0.25 kW local Nonlinear Load, which is a conventional three-phase rectifier. Both techniques have a similar behavior than Case 3 because the power flow is the same but they produce smaller detection times and more distortion in the transient gap. In this particular case, the self-adaptive gain $k_e$ (eq. 8) for $EA^2T$ takes the value of 0.009. For SVS, the value is manually selected to 0.01 according to FIG. 3, maintaining an acceptable $THD_i$ of less than 5%. As a result, it can be seen in FIG. 9 (b) that $EA^2T$ has a detection time of 2.1 ms; however, the SVS has a longer detection time after the islanding condition with 6.1 ms (See FIG. 9 (c)).

Summarizing the four cases of study, it can be seen that in all the tests, the NDZ has been improved and a $THD_v$~4% has been maintained in the grid-connected operation. Moreover, the detection time has been reduced and the waveform of the transient response is maintained as in SVS. In all cases, reducing a potential damage to the load.

Certainly, standards for Grid-Connected systems indicate a maximum of 2 seconds for the detection time; however, it is always a good practice to achieve the detection in a faster way to prevent malfunction in the equipment that is still connected in the grid.

Figure 10:
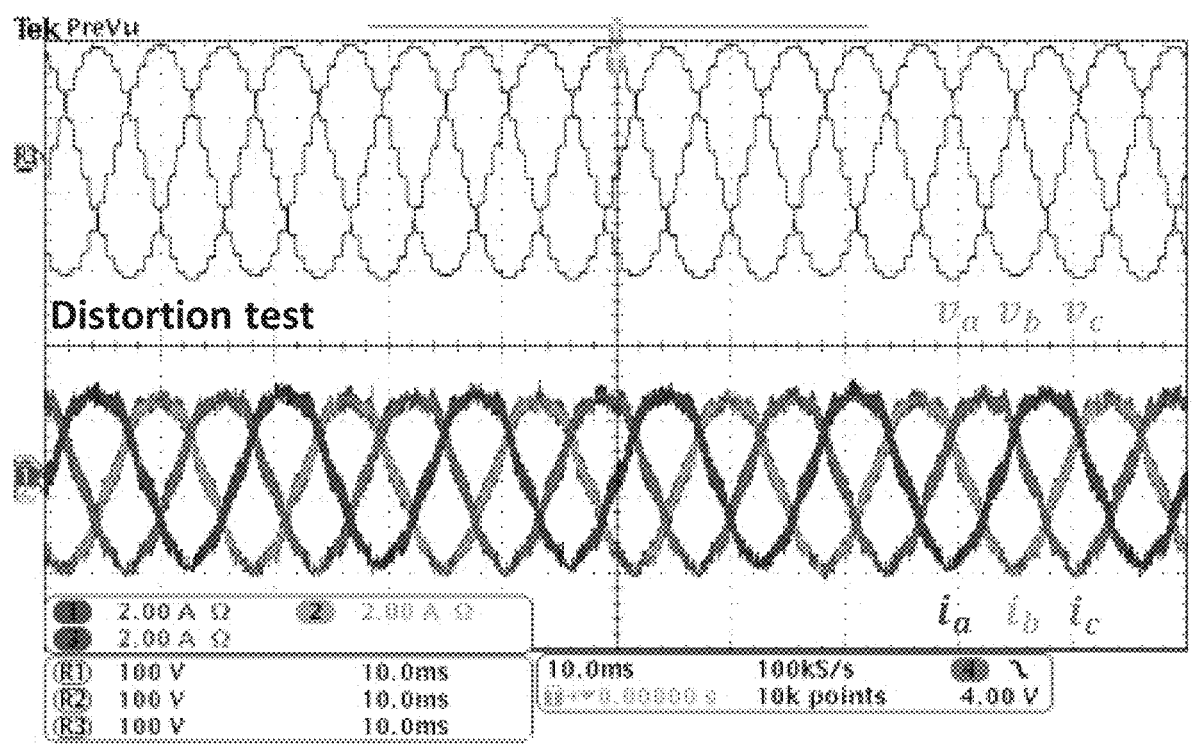
FIG. 10 shows a robustness of the EA²T technique vs voltage harmonics components with THD of 9%. Three-phase distorted voltage, R1, R2, R3 (150 V/div, 10 ms/div), and three-phase balanced currents (5 A/div, 10 ms/div).

It is important to notice that a false positive may occur due to variations of the grid voltage and not necessarily for disconnection, but certainly, the permitted region is determined by the standards. For this reason, a robustness test of the $EA^2T$ technique vs voltage harmonics components have been made in FIG. 10. It can be seen that the current injection is still working, even with a distorted voltage grid of $THD_v$=9% causing a $THD_i$ in the third and fifth harmonic of less than 4%. Clearly, this distortion is in the limits of the recommended in IEEE Standard 929-2000 for six-pulse converters.

Although the results of the proposed invention versus the SVS are satisfactory. It is important to compare the method to other anti-islanding techniques, which is described in the next section.

Example 3

Comparison of the Invention with Other Anti-Islanding Techniques

In Table 2, the performance of the proposed invention is compared to the most representative active anti-islanding techniques which are the Reactive Power Variation Method (RPVM) (Jo, J., Cha, H.: "Performance of anti-Islanding of an improved reactive power variation method based on positive feedfback," in "2017 IEEE Energy Conversion Congress and Exposition, ECCE 2017" (Institute of Electrical and Electronics Engineers Inc., 2017), pp. 4761-4765), the Adaptive Reactive Power Control (ARPC) (Chen, X., Wang, X., Jian, J., Tan, Z., Li, Y., Crossley, P.: "Novel islanding detection method for inverter-based distributed generators based on adaptive reactive power control"J. Eng., 2019, 2019, (17), pp. 3890-03894), and the Active Cross-Correlation Anti-islanding Scheme ($AC^2AS$) (Voglitsis, D., Papanikolaou, N. P., Kyritsis, A. C.: "Active Cross-Correlation Anti-Islanding Scheme for PV Module-Integrated Converters in the Prospect of High Penetration Levels and Weak Grid Conditions"IEEE Trans. Power Electron., 2019, 34, (3), pp. 2258-2274). All the compared techniques are classified as active techniques with small variations among them. It can be seen a brief description of every active technique, including the proposed invention in the second row of Table 2. In addition, the most important parameters of every technique are presented in the lower part of the table.

In addition, the third row of Table 2 summarizes the detection times of the compared techniques. It is important to note that the fastest detection time is registered by the proposed $EA^2T$ technique with a range of 2.1-7 ms. It is followed by the SVS with detection times between 6.1-27 ms. RPVM and ARPC have reported detection times of 53-150 ms and 48.3-276 ms, respectively. Finally, the $AC^2AS$ reported detection times of more than 400 ms, which is the slowest method of the compared techniques.

Next, the fourth row of Table 2 depicts a qualitative comparison of the NDZ among the active anti-islanding techniques. According to FIGS. 3 and 4, $EA^2T$ has a smaller NDZ than SVS and it is in function of the feedback self-adaptive gain $k_e$. Furthermore, the RPVM and the ARPC methods have a low and a very low NDZ, respectively. This is in the most critical case when the power injection is the same as the consumed load power ($P_{inj}=P_{Load}$), and the impedance $Z_R$ is equal to the impedance $Z_{LC}$. Also, the $AC^2AS$ has a very low NDZ, which is in function of grid weakness.

Moreover, it is shown in the fifth row of Table 2 that any of the compared active anti-islanding technique needs a current sensor to detect the islanding condition.

One important characteristic of the active techniques is their perturbation intensity to the grid which is shown in the sixth row of Table 2. According to FIG. 3, the $EA^2T$ and SVS have a very low power quality distortion, which is less than 5% of $THD_i$. Even so, RPVM and ARPC have a variation of the power of the inverter $P_{inv}$ of ±5%, and −5% and +7%, respectively, which is greater than the values used in $EA^2T$ and SVS. On the other hand, $AC^2AS$ injects a small perturbation of 1% of the second harmonic component.

Furthermore, it is important to highlight the complexity comparison shown in the seventh row of Table 2. It can be seen that $EA^2T$ and SVS are simple and easy to implement. However, RPVM, ARPC, and $AC^2AS$ are more complex than the previous methods due to the utilization of more complex mathematical operations.

Finally, the proposed invention can be compared also with remote based islanding recognition techniques, which can eliminate the NDZ completely. According to (Das, P., Ghore, S., Biswal, M.: "Comparative assessment of various islanding detection methods for AC and DC microgrid," in "2020 1st International Conference on Power, Control and Computing Technologies, ICPC2T 2020" (Institute of Electrical and Electronics Engineers Inc., 2020), pp. 396-400), the PLCC and the SCADA systems have null NDZ and zero error detection ratio; however, the detection times are 200 ms for PLCC and 100 ms-300 ms for SCADA under optimized conditions.

This is at least fourteen times slower than the worst detection time registered for the proposed invention $EA^2T$ (7 ms for case 1). Moreover, due to the high installation cost in comparison with active techniques, it is not viable for small scale DPGSs.

TABLE 2

Comparison summary of different anti-islanding techniques.

| | INVENTION $EA^2T$ [a] | SVS [b] | RPVM [c] | ARPC [d] | $AC^2AS$ [e] |
|---|---|---|---|---|---|
| Classification | Exponential Active Power Variation | Active Power Variation | Reactive Power Variation | Adaptive Reactive Power Control | Modified Incremental Conductance |
| Description | The inverter has faster response in voltage with corresponding exponential changes in current that are sufficient to cause a further change in the same direction | The inverter responds to small changes in voltage with corresponding changes in current that are sufficient to cause a further change in the same direction | It consists of two parts. The first part has a fundamental amplitude of ±5% $P_{inv}$, and the second part has a positive feedback using a frequency deviation | The voltage variation and correlation factor between reactive power disturbance and frequency variation are the criteria for the adaptive disturbance slope | The scheme periodically injects a second-order harmonic current component of low magnitude and evaluates grid response by means of correlation |
| Detection time | 2.1-7 ms [f] | 6.1-27 ms [f] | 53-150 ms [f] | 48.3-276 ms [f] | <400 ms |
| NDZ | Lower than SVS. See FIG. 4. | Depends on feedback gain $k_e$ | Low [g] | Very low [g] | Very low [h] |
| AC current sensor | No | no | no | no | no |
| Power quality distortion | Very low. According to Standard IEEE 1547 (<5% THD) | Very low. According to Standard IEEE 1547 (<5% THD) | ±5% $P_{inv}$ | -5% $P_{inv}$, +7% $P_{inv}$ | 1% of the second harmonic component. According to IEC 61727 |
| Complexity | Low. Exponential positive feedback gain | Very low. Linear positive feedback gain | Medium. It is designed for synchronous reference frame, adding more transformation matrix to solve | Medium. It is based on reactive power and frequency variation functions | Medium. It has to compute mainly the cross-correlation algorithm and a cost function |

[a] Exponential Active Anti-islanding Technique. Self-adaptive gain $k_e$ according to (8);
[b] Sandia Voltage Shift. Gain $k_e$ must be changed manually according to FIG. 3;
[c] Reactive Power Variation Method based on Positive Feedback. $K_{RPV}$ = 0.24 (Constant gain), $P_{inv}$ = 1.3 kW, $V_{grid}$ = 220 $V_{rms}$, $f_o$ = 60 Kz, $Q_f$ = 2.5 (Quality factor), PF = 0.9975 (Power Factor) (Jo, J., Cha, H.: "Performance of anti-Islanding of an improved reactive power variation method based on positive feedfback," in "2017 IEEE Energy Conversion Congress and Exposition, ECCE 2017" (Institute of Electrical and Electronics Engineers Inc., 2017), pp. 4761-4765);
[d] Adaptive Reactive Power Control. |ΔV| ≥ 0.04 p.u. (Voltage fluctuation), $C_f$ (Correlation factor in function of the power quality distortion, fundamental frequency and voltage variation), $Q_f$ = 2.5 (Chen, X., Wang, X., Jian, J., Tan, Z., Li, Y., Crossley, P.: "Novel islanding detection method for inverter-based distributed generators based on adaptive reactive power control" J. Eng., 2019, 2019, (17), pp. 3890-3894);
[e] Active Cross-Correlation Anti-islanding Scheme. DPF = 1 (Displacement Power Factor), $x_r$ = 0.165 (Reactance-resistance ratio at PCC), $\varphi_{ref}$ = -62° (Phase angle of $V_{ref}$), $CC_{Base}$ = 1018 (Cross-correlation index of two periodical signals) (Voglitsis, D., Papanikolaou, N. P., Kyritsis, A. C.: "Active Cross-Correlation Anti-Islanding Scheme for PV Module-Integrated Converters in the Prospect of High Penetration Levels and Weak Grid Conditions" IEEE Trans. Power Electron., 2019, 34, (3), pp. 2258-2274);
[f] Under voltage nominal conditions. $V_{grid}$ = 220 $V_{rms}$;
[g] Critical case $P_{inj}$ = $P_{Load}$, $Z_R$ = $Z_{LC}$;
[h] NDZ is function of grid weakness.

The invention claimed is:

1. A system with a controller for detecting islanding at a point of common coupling between a source and a utility grid, the controller of the system comprising:
   a root mean square function;
   an exponential function;
   an absolute function;
   a sign function;
   an adaptive gain;
   a voltage sensor at the point of common coupling measures a voltage signal;
   a reference amplitude,
   a comparator;
   wherein a peak voltage amplitude is calculated by the root mean square of said voltage signal;
   wherein said absolute value function is an input of the exponential function, which is summed by −1 producing a first signal,
   wherein the sign function multiplies the first signal, producing an exponential current perturbation signal,
   wherein said exponential current perturbation signal is added to a reference current of an inverter current control;
   wherein the adaptive gain is in function of an injected power, a root mean square voltage at the point of common coupling, wherein said comparator has a low limit value and a high limit value; and
   wherein if the peak voltage amplitude is under the low limit value or above the high limit value, then a disconnection signal is generated to turn off the source of power linked by an inverter, otherwise, if the peak voltage amplitude is above the low limit value and under the high limit value, then the inverter remains injecting current to the utility grid.

2. The system according to claim 1, wherein the reference amplitude is subtracted to the peak voltage amplitude to produce a voltage error which is multiplied by the adaptive gain, producing a second signal, wherein said second signal is an input of the absolute function, and the sign function.

3. A method for detecting an islanding at a point of common coupling between a source of power and a utility grid, the method comprising the following step of:
- a) measuring a voltage signal of the utility grid at the point of common coupling;
- b) determining a peak voltage amplitude by means of a root mean square of the voltage at the point of common coupling;
- c) determining a voltage error by means of subtracting the reference amplitude from the peak voltage amplitude;
- d) determining an adaptive gain and multiplying with the voltage error;
- e) determining an absolute value of the multiplication of the adaptive gain and the voltage error, determining an exponential value of the absolute value, adding −1 to the exponential value, determining a sign value of the multiplication of the adaptive gain and the voltage error, multiplying the sign value with the exponential value −1;
- f) adding an exponential current perturbation signal to a reference current of an inverter current control;
- g) comparing the peak voltage amplitude with a low limit value and with a high limit value; and wherein the exponential current perturbation is produced by the multiplication of the exponential value −1, and the sign value; wherein the adaptive gain is in function of an injection power, a root mean square voltage at the point of common coupling, and a reference amplitude; wherein if the peak voltage amplitude is under the low limit value or is over the high limit value the utility is shut down and an inverter is turned off, otherwise, if the peak voltage amplitude remains above the low limit value and the high limit value the utility grid is still operating.

4. The method according to claim 3, further comprising the following step of updating the injected power by an exponential current perturbation signal.

* * * * *